(12) United States Patent
Ishizaka (10) Patent No.: US 11,314,506 B2
(45) Date of Patent: Apr. 26, 2022

(54) SECURE COMPUTATION DEVICE, COMPARISON METHOD, COMPARISON PROGRAM RECORDING MEDIUM, AND SECURE COMPUTATION SYSTEM

(71) Applicant: NEC Corporation, Tokyo (JP)

(72) Inventor: Kazuhisa Ishizaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 220 days.

(21) Appl. No.: 16/613,967

(22) PCT Filed: May 8, 2018

(86) PCT No.: PCT/JP2018/017754
§ 371 (c)(1),
(2) Date: Nov. 15, 2019

(87) PCT Pub. No.: WO2018/212015
PCT Pub. Date: Nov. 22, 2018

(65) Prior Publication Data
US 2021/0334100 A1   Oct. 28, 2021

(30) Foreign Application Priority Data
May 18, 2017 (JP) .............................. JP2017-098853

(51) Int. Cl.
*G06F 9/30* (2018.01)
*H04L 9/00* (2022.01)

(52) U.S. Cl.
CPC ........ *G06F 9/30029* (2013.01); *G06F 9/3001* (2013.01); *G06F 9/30018* (2013.01);
(Continued)

(58) Field of Classification Search
CPC ............. G06F 9/30029; G06F 9/30134; G06F 9/3001; G06F 9/30018
See application file for complete search history.

(56) References Cited

U.S. PATENT DOCUMENTS

2016/0335924 A1* 11/2016 Ikarashi .................. G06F 21/60
2017/0278433 A1   9/2017 Furukawa
(Continued)

FOREIGN PATENT DOCUMENTS

| JP | 2008-020871 A | 1/2008 |
|---|---|---|
| JP | 5957126 B1 | 7/2016 |

(Continued)

OTHER PUBLICATIONS

Hazay et al.; Efficient Protocols for Set Intersection and Pattern Matching with Security Against Malicious and Covert Adversaries; 2008 (Year: 2008).*

(Continued)

*Primary Examiner* — Corey S Faherty
(74) *Attorney, Agent, or Firm* — Sughrue Mion, PLLC (57) ABSTRACT

Provided is a secure computation device for computing a comparison operation to two integers without the use of AND/XOR. The secure computation device compares a first integer a and a second integer b when the first integer a and the second integer b, which are 0 or greater and less than $2^k$ (k being an integer of 1 or greater), are subjected to ring sharing. The secure computation device includes: an addition/subtraction circuitry; a bit decomposition circuitry; and a bit extraction circuitry. The addition/subtraction circuitry uses the first integer a, the second integer b, and $2^k$ to carry out a predetermined addition or subtraction with ring sharing, and output an added/subtracted result. The bit decomposition circuitry converts the added/subtracted result to bit sharing, and outputs a bit shared result. The bit extraction circuitry extracts a (k+1)-th bit of the bit shared result, and outputs an extracted result.

20 Claims, 3 Drawing Sheets

(52) U.S. Cl.
CPC ............ *G06F 9/30134* (2013.01); *H04L 9/00* (2013.01); *H04L 2209/00* (2013.01)

(56) References Cited

U.S. PATENT DOCUMENTS

| | | |
|---|---|---|
| 2017/0310473 A1 | 10/2017 | Takiguchi et al. |
| 2018/0158377 A1 | 6/2018 | Ikarashi et al. |
| 2018/0294950 A1* | 10/2018 | Khedr .................... H04L 9/008 |

FOREIGN PATENT DOCUMENTS

| | | |
|---|---|---|
| JP | 2016-173531 A | 9/2016 |
| JP | 2016-173533 A | 9/2016 |
| WO | 2016/042693 A1 | 3/2016 |
| WO | 2016/056473 A1 | 4/2016 |

OTHER PUBLICATIONS

International Search Report for PCT Application No. PCT/JP2018/017754, dated Aug. 14, 2018.
English translation of Written opinion for PCT Application No. PCT/JP2018/017754.
Tal Rabin et al., "Verifiable Secret Sharing and Multiparty Protocols with Honest Majority (Extended Abstract)". STOC 1989, Israel: 73-85.
Oded Goldreich et al., "How to Solve any Protocol Problem—An Efficiency Improvement (Extended Abstract)" CRYPTO 1987, Israel: 73-86.
Dai Ikarashi et al., "O(I)Bits Communication Bit Decomposition and O(|p'|) Bits Communication Modules Conversion for Small k Secret-sharing-based Secure Computation", Computer Security Symposium 2013, Oct. 21-23, 2013, Japan, 785-792.
Damgard, I. et al., "Unconditionally Secure Constant-Rounds Multi-party Computation for Equality, Comparison, Bits and Exponentiation", Lecture Notes in Computer Science, vol. 3876, Springer, Mar. 4, 2006, p. 285-304, Third Theory of Cryptography Conference, TCC2006,New York, USA, Mar. 4-7, 2006, Proceedings.
Japanese Office Action for JP Application No. 2019-519187 dated Sep. 1, 2021 with English Translation.
Koki Hamada et al., "Privacy Preserving Fisher's Exact Test (2)—For Large Samples", Technical Report on Security Psychology & Trust (SPT), Information Processing Society of Japan, Jul. 2016, IPSJ SIG Technical Report, vol. 2016-SPT-19, No. 38, pp. 1-6.
Koki Hamada et al., "A Round-Efficient Pattern Matching Algorithm for Secure Multi-party Computation", Transactions of Computer Security Symposium 2014, information Processing Society of Japan, Oct. 2014, IPSJ Symposium Series, vol. 2014, No. 2, pp. 674-681.

* cited by examiner

SECURE COMPUTATION DEVICE, COMPARISON METHOD, COMPARISON PROGRAM RECORDING MEDIUM, AND SECURE COMPUTATION SYSTEM

This application is a National Stage Entry of PCT/JP2018/017754 filed on May 8, 2018, which claims priority from Japanese Patent Application 2017-098853 filed on May 18, 2017, the contents of all of which are incorporated herein by reference, in their entirety.

TECHNICAL FIELD

This invention relates to a secure computation device, a comparison method, a comparison program recording medium, and a secure computation system.

BACKGROUND ART

A secure computation method is a method of computing a given function by a plurality of secure computation devices performing computation while communicating with one another. Moreover, the secure computation method has such a characteristic that none of the secure computation devices cannot acquire information on input/output to/from the function unless data to be handled are shared between a sufficient number of secure computation devices.

As a publicly known secure computation method, a method described in Non Patent Literature 1 is known.

In the method described in Non Patent Literature 1, a secret S, which is a value in a certain field, is shared between a plurality of secure computation devices by using a polynomial F satisfying $F(0)=S$ in this field. It is assumed that, when the number of secure computation devices is N and the number of secrets is less than K, the information on the input/output to/from the function cannot be acquired. In this technical field, such a technology is referred to as "secret sharing". It is also assumed that different values in the field are assigned to the secure computation devices, and the value of the field assigned to the i-th secure computation device is denoted by $X[i]$, where $1 \leq i \leq N$.

When a secret A is shared to the plurality of secure computation devices, $F[i]:=F(X[i])$ on randomly selected (K−1)th-order polynomial F satisfying $F(0)=A$ is distributed to each i-th secure computation device.

Similarly, for a secret B, $G[i]:=G(X[i])$ on a (K−1)th-order polynomial G satisfying $G(0)=B$ is distributed to each i-th secure computation device.

Regarding the secrets, the (K−1)th-order polynomial can be solved by a group of K or more secure computation devices. Thus, coefficients of F and G can be obtained, and $F(0)$ and $G(0)$ can consequently be computed.

In order to compute a shared value of A+B, each i-th secure computation device computes $H[i]=F[i]+G[i]$. This value is $H(X[i])$ acquired by assigning $X[i]$ to the polynomial H having coefficients, each of which is a sum of corresponding coefficients of F and G, and is thus a value acquired by sharing A+B among the plurality of secure computation devices as in the case of the secret A and the secret B.

As in the cases of the secret A and the secret B, the (K−1)th-order polynomial can be solved by a group of K or more secure computation devices. Thus, coefficients of H can be obtained, and $H(0)$ can consequently be computed.

When $K*2 \leq N+1$, in order to compute a shared value of A*B, each i-th secure computation device computes $H[i]=F[i]*G[i]$. This value is $H(X[i])$ acquired by assigning $X[i]$ to the 2K-th-order polynomial $H(X)=F(X)*G(X)$, and is thus a value acquired by sharing A*B among the plurality of secure computation devices as in the cases of the secret A and the secret B. As is different from the cases of the secret A and the secret B, the order of H is 2K and hence the 2K-th-order polynomial can be solved by a group of 2K or more secure computation devices. Thus, coefficients of H can be acquired, and $H(0)$ can consequently be computed.

The sharing method for A*B is different from that for the secret A and the secret B. In order to similarly share A*B in the form of using the (K−1)th-order polynomial, each i-th secure computation device generates a (K−1)th-order polynomial G from $H[i]$, and distributes $G(X[j])$ to each j-th secure computation device. With the method disclosed in Non Patent Literature 1, all functions constructed by addition and multiplication can be computed in this manner.

With the method disclosed in Non Patent Literature 1, the multiplication and the addition in the field can easily be computed, but 2K N+1 exists as a condition. Unless K is equal to or more than 2, a single secure computation device cannot acquire a secret, and N is thus equal to or more than 3.

$X[i]$ needs to be different for each different i and, hence, with the method disclosed in Non Patent Literature 1, a Galois field GF(2) is not included in available fields. Since the Galois field GF(2) is not included, the method disclosed in Non Patent Literature 1 cannot use addition as the exclusive OR.

As another publicly known secure computation method, a method disclosed in Non Patent Literature 2 is known.

Non Patent Literature 2 includes a description relating to a method in a case where the number of secure computation devices is two. With this method, when two secure computation devices hold a bit, namely, an element b in the Galois field GF(2), in a shared state, b and c satisfying $b+c=b \mod 2$ are shared and held by the respective secure computation devices.

With this method, when a certain bit A and a certain bit B are shared by a first secure computation device and a second secure computation device, the first secure computation device holds C and E and the second secure computation device holds D and F, where $A=C+D \mod 2$ and $B=E+F \mod 2$. On this occasion, an exclusive OR G of bit A and the bit B is $G=A+B \mod 2$, and the shares thereof for the first secure computation device and the second secure computation device can be $H=C+E \mod 2$ and $J=D+F \mod 2$, respectively.

Each of the secure computation devices can compute the shares of the exclusive OR of the two values shared through light computation without communicating with the other secure computation devices.

Similarly, when the bit A and the bit B are shared and held, the following computation is carried out so that the first secure computation device acquires L and the second secure computation device acquires M, where L and M are respective shares of an AND $K=A \cdot B$ of those two bits, that is, satisfy $L+M=K \mod 2$.

The first secure computation device randomly generates L. On this occasion, $M=(C+D) \cdot (E+F)=L \mod 2$. Therefore, in accordance with the values D and F held by the second secure computation device, the first secure computation device thus the following values to the second secure computation device without knowing the value of M. When $(D, F)=(0, 0)$, $M=(C+0) \cdot (E+0)+L \mod 2$ is returned. When $(D, F)=(0, 1)$, $M=(C+0) \cdot (1+E)+L \mod 2$ is returned. When $(D, F)=(1, 0)$, $M=(1+C) \cdot (E+0)+L \mod 2$ is returned. When $(D, F)=(1, 1)$, $M=(1+C) \cdot (1+E)+L \mod 2$ is returned.

The first secure computation device transmits to the second secure computation device the value dependent on an input to the second secure computation device. The method in which the first secure computation device cannot know the input to the second secure computation device is implemented by a technology referred to as oblivious transfer between the first secure computation device and the second secure computation device. However, this technology generally requires both devices to perform a large amount of computation and communication.

The secure computation methods disclosed in Non Patent Literatures 1 and 2 assume that each secure computation device behaves honestly.

Patent Literature 1 describes secret sharing and secure computation. The secret sharing is a technology that converts data into a plurality of shared values (secret shared values) and makes it possible to reconstruct the original data through the use of secret shared values whose number is greater than or equal to a given number and makes it impossible to reconstruct the original data from secret shared values whose number is smaller than the given number. (k, n)-secret sharing, which is a type of secret sharing, is secret sharing by which secret shared values obtained by dividing an input plain text into n pieces are distributed to n calculation entities and the plain text can be reconstructed if arbitrary k secret shared values are collected, but any information on the plain text cannot be obtained from secret shared values whose number is smaller than k. The secret computation is a technology by which data (original data) to be calculated is subjected to secret sharing and stored in a plurality of calculation entities and secret shared values of function values of the original data are calculated in cooperation with other calculation entities without reconstructing the original data.

Patent Literature 2 discloses an example of a secure computation system in which a bit W is shared and stored in first through third secure computation devices. On this occasion, three randomly selected bits R[1], R[2] and R[3] satisfying R[1]+R[2]+R[3]=0 mod 2 are used. The first secure computation device stores (R[1], W+R[2] mod 2). The second secure computation device stores (R[2], W+R[3] mod 2). The third secure computation device stores (R[3], W+R[1] mod 2).

Patent Literature 3 discloses a shared value conversion system for converting a shared value of additive secret sharing to a shared value of replicated secret sharing with less communication volume. The replicated secret sharing is one of the above-mentioned (k, n)-secret sharing. The additive secret sharing is (k, k)-secret sharing by means of the replicated secret sharing. The (k, k)-secret sharing is a case where n=k in the (k, n)-secret sharing. The (k, k)-secret sharing cannot restore a plain text as long as shares of all parties are not gathered. Patent Literature 3 discloses the shared value conversion system including three shared value conversion devices. A sharing generation unit in each shared value conversion device generates a share of the replicated secret sharing using a share of the additive secret sharing and a random number.

Patent Literature 4 discloses a shared value conversion system for converting a shared value of Shamir secret sharing to a shared value of replicated secret sharing. The Shamir secret sharing is also one of the above-mentioned (k, n)-secret sharing. The Shamir secret sharing assigns coordinates to an i-th party and shares a plain text using a random number.

Non Patent Literature 3 describes bit decomposition. The bit decomposition means an operation of converting one ciphertext (or a secret shared value) storing a 1-bit numerical value to a train having a length of 1 that consists of the ciphertext/secret shared values of 1-bit truth values.

CITATION LIST

Patent Literature

PL 1: WO 2016/056473
PL 2: WO 2016/042693
PL 3: JP 2016-173533 A
PL 4: JP 2016-173531 A

Non Patent Literature

NPL 1: Tal Rabin, Micheal Ben-Or: Verifiable Secret Sharing and Multiparty Protocols with Honest Majority (Extended Abstract). STOC 1989: 73-85
NPL 2: Oded Goldreich, Ronen Vainish: How to Solve any Protocol Problem—An Efficiency Improvement. CYPTO 1987: 73-86
NPL 3: Dai Ikarashi, Koki Hamada, Ryo Kikuchi and Koji Chida: "O(1) Bits Communication Bit Decomposition and O(|p'|) Bits Communication Modulus Conversion for Small k-Secret-Sharing-Based Secure Computation", Computer Security Symposium 2013, 21-23 Oct. 2013

SUMMARY OF INVENTION

Technical Problem

Any of Non Patent Literatures 1 to 3 and Patent Literatures 1 to 4 mentioned above neither describes nor discloses how to carry out a comparison operation of integers concretely. The secure computation carries out an operation in a state where data is kept encrypted. Therefore, in general, in a case of carrying out a comparison operation between two integers, it is necessary to realize the comparison operation by a combination of XOR (exclusive OR) and AND (logical product) in the manner which will later be described in detail. As a result, there is a problem that a processing time is extended.

It is an object of this invention to provide a secure computation device, a comparison method, a comparison program recording medium, and a secure computation system, which can solve the above-mentioned problem.

Solution to Problem

A secure computation device according to the present invention is for comparing, in a case where a first integer a and a second integer b, each of which is more than 0 and less than $2^k$ (where k is an integer equal to or more than one), are subjected to ring sharing, the first integer a with the second integer b, wherein the secure computation device comprises an addition/subtraction circuitry configured to carry out a predetermined addition/subtraction using the first integer a, the second integer b, and $2^k$ with the ring sharing to produce an added/subtracted result; a bit decomposition circuitry configured to convert the added/subtracted result into bit sharing to produce a bit shared result; and a bit extraction circuitry configured to extract a (k+1)-th bit of the bit shared result to produce an extracted result.

A secure computation system according to the present invention comprises N secure computation devices each of which is described above, where N represents an integer which is not less three.

A comparison method according to the present invention is for comparing, in a case where a first integer a and a second integer b, each of which is more than 0 and less than $2^k$ (where k is an integer equal to or more than one), are subjected to ring sharing, the first integer a with the second integer b in a secure computation device, wherein the comparison method comprises an addition/subtraction step of carrying out a predetermined addition/subtraction using the first integer a, the second integer b, and $2^k$ with the ring sharing to produce an added/subtracted result; a bit decomposition step of converting the added/subtracted result into bit sharing to produce a bit shared result; and a bit extraction step of extracting a (k+1)-th bit of the bit shared result to produce an extracted result.

A comparison program recording medium according to the present invention stores a comparison program for causing, in a case where a first integer a and a second integer b, each of which is more than 0 and less than $2^k$ (where k is an integer equal to or more than one), are subjected to ring sharing, a computer serving as a secure computation device to compare the first integer a with the second integer b, wherein the comparison program causes the computer to achieve an addition/subtraction function of carrying out a predetermined addition/subtraction using the first integer a, the second integer b, and $2^k$ with the ring sharing to produce an added/subtracted result; a bit decomposition function of converting the added/subtracted result into bit sharing to produce a bit shared result; and a bit extraction function of extracting a (k+1)-th bit of the bit shared result to produce an extracted result.

Advantageous Effect of the Invention

According to the present invention, it is possible to provide a secure computation device, a comparison method, a comparison program recording medium, and a secure computation system, which are capable of performing a comparison computation without AND/XOR operations.

DESCRIPTION OF EMBODIMENTS

Related Art

In order to facilitate an understanding of the present invention, a related art will be described.

First, a summary of secure computation will be described.

Figure 1:
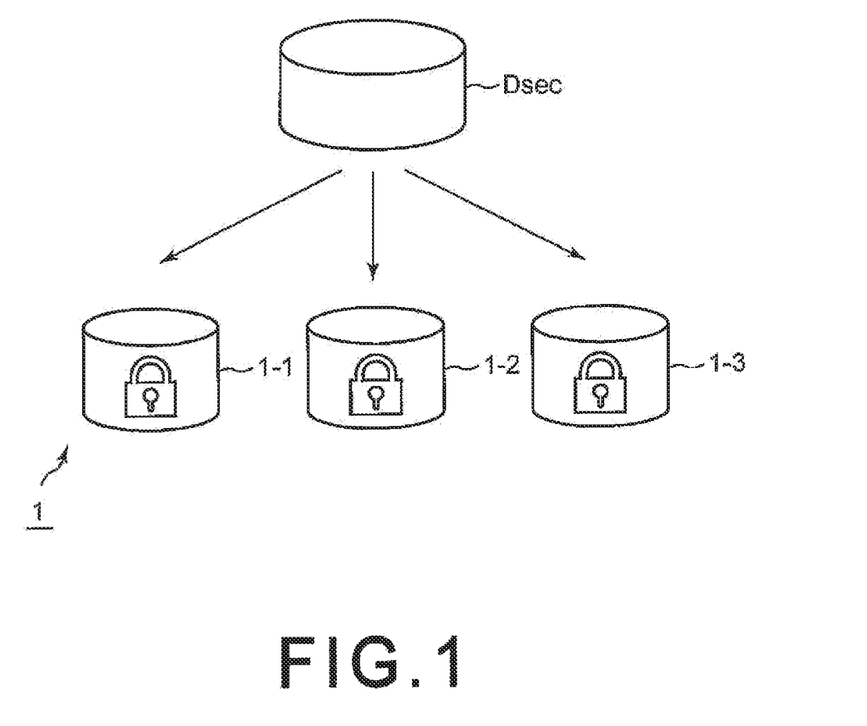
FIG. 1 is a diagram for illustrating an example in a related art where three computers (secure computation devices) share and save data Dsec to be kept secret, as first through third shared values, respectively.

FIG. 1 is a diagram for illustrating an example where three computers (secure computation devices) 1-1, 1-2, and 1-3 share and save data Dsec to be kept secret, as first through third shared values, respectively. Thus, the data Dsec is split into a plurality of shared values. Therefore, original data Dsec is not known unless all or N or more shared values are collected (where N represents an integer which is not less than two). In addition, each of the computers 1-1 to 1-3 may also be called a node or a party.

Inasmuch as the original data Dsec is shared and managed in the plurality of computers 1-1 to 1-3 as mentioned above, the original data Dsec is secure even if an administrator of any computer leaks the shared value of himself.

When contents computed by the respective computers 1-1 to 1-3 are merged, a computed result for the original data Dsec is obtained. Security is assured also during computation.

Next, secret sharing will be described.

It is assumed that an integer v is split into three to be distributed to the respective nodes 1-1 to 1-3. As the secret sharing, bit sharing and ring sharing are known, which will be described hereafter.

The bit sharing is represented by the following equation:

$$v = v0 \wedge v1 \wedge v2,$$

where an operator $\wedge$ represents an exclusive OR (XOR).

On the other hand, the ring sharing is represented by the following equation:

$$v = v0 + v1 + v2,$$

where an operator + represents an additive operation (addition) on the ring.

Conversion between two sharing methods is possible. Converting from the ring sharing to the bit sharing is called "bit decomposition." A method of the "bit decomposition" is described in the above-mentioned Non Patent Literature 3 and, therefore, the description thereof is omitted herein.

On the other hand, converting from the bit sharing to the ring sharing is called "bit composition." Now, a method of the "bit composition" will be described.

The bit composition is carried out in the following manner:

1. Shares a random number r on a ring;
2. Bit-decomposes shared information of the random number r;
3. Performs secure computation of an addition circuit about the shared information of the bit-decomposed random number and shared information of a target bit to be subjected to the bit composition and restores a result thereof. Assuming that x represents the result of the bit composition, r+x is restored; and
4. Performs ring sharing of r+x and then a result obtained by executing (r+x)−r as the secure computation of the share on the ring becomes the result of the bit composition.

The bit sharing and the ring sharing have characteristics which will be described hereafter. Specifically, by making two values be random numbers, they have following characteristics:

1) An original value is not known from individual shared values; and
2) The original value cannot be restored unless all of three shared values are collected.

Each of nodes (parties) 1-1 to 1-3 has two shared values among the three shared values. This is called the secret sharing. For example, it is assumed that the parties 1-1 to 1-3 are represented by Party0, Party1, and Party2, respectively. In this event, those parties have the two shared values as follows:

Party0: (v2, v0),
Party1: (v0, v1), and
Party2: (v1, v2).

Accordingly, the original value v cannot be restored unless at least two parties cooperate with each other.

Now, description will proceed to specific secure computation. The secure computation executes an operation without restoring the original value v.

Specifically, in regard to original values v and w, in the bit sharing and the ring sharing, the following operations are possible.

That is, in a case of the bit sharing, operations of $v \wedge w$ and v&w are possible. Herein, an operator & represents AND (logical product).

On the other hand, in a case of the ring sharing, operations of v+w and v*w are possible. Herein, an operator * represents multiplicative operation (multiplication).

A more complicate operation is carried out by combining these operations.

Now, description will proceed to a specific example of the secure computation in the case of bit sharing. First, description will proceed to the secure computation in the case of XOR (exclusive OR).

It is assumed that the integers v and w are respectively subjected to bit sharing as follows:

$$v = v0 \wedge v1 \wedge v2, \text{ and}$$

$$w = w0 \wedge w1 \wedge w2$$

and the first through the third parties 1-1 to 1-3 respectively hold:

Party0: (v2,v0), (w2,w0),
Party1: (v0,v1), (w0,w1), and
Party2: (v1,v2), (w1,w2)
$v \wedge w$ is represented by the following equation:

$$v \wedge w = (v0 \wedge w0) \wedge (v1 \wedge w1) \wedge (v2 \wedge w2).$$

Then, the respective parties 1-1 to 1-3 compute the following equations:

Party0: $(x2,x0) = (v2 \wedge w2, v0 \wedge w0)$,

Party1: $(x0,x1) = (v0 \wedge w0, v1 \wedge w1)$, and

Party2: $(x1,x2) = (v1 \wedge w1, v2 \wedge w2)$.

On the other hand, x is represented by the following equation:

$$x = x0 \wedge x1 \wedge x2 = v \wedge w.$$

Accordingly, the respective parties 1-1 to 1-3 are supposed to have shared values of a result of $v \wedge w$.

Herein, communication between the parties 1-1 to 1-3 is unnecessary.

Now, description will proceed to the secure computation in a case of AND.

v&w is represented by the following equation:

$$\begin{aligned} v \& w &= (v0 \wedge v1 \wedge v2) \& (w0 \wedge w1 \wedge w2) \\ &= (v0 \& w0) \wedge (v0 \& w2) \wedge (v2 \& w0) \\ &\wedge (v1 \& w1) \wedge (v1 \& w0) \wedge (v0 \& w1) \\ &\wedge (v2 \& w2) \wedge (v2 \& w1) \wedge (v1 \& w2). \end{aligned}$$

The respective parties 1-1 to 1-3 compute, using random numbers $m0 \wedge m1 \wedge m2 = 0$, the following equations:

Party0: $x0 = (v0 \& w0) \wedge (v0 \& w2) \wedge (v2 \& w0) \wedge m0$,

Party1: $x1 = (v1 \& w1) \wedge (v1 \& w0) \wedge (v0 \& w1) \wedge m1$, and

Party2: $x2 = (v2 \& w2) \wedge (v2 \& w1) \wedge (v1 \& w2) \wedge m2$.

In this event, the following equation holds:

$$x0 \wedge x1 \wedge x2 = v \& w.$$

Accordingly, when the respective parties 1-1 to 1-3 deliver data to a neighboring party, the respective parties 1-1 to 1-3 are supposed to hold shared values which are represented by the following equations:

Party0: (x2,x0),

Party1: (x0,x1), and

Party2: (x1,x2).

As a result, the respective parties 1-1 to 1-3 are supposed to hold shared values of v&w.

In this case, inasmuch as x0, x1, and x2 are masked with the random numbers, information does not leak out.

In addition, communication is necessary for computation of AND.

Now, description will proceed to the secure computation in a case of the ring sharing.

In the ring sharing, the operation of v+w is possible without communication while the operation of v*w requires communication.

Inasmuch as derivation is same as that in the case of the above-mentioned bit sharing, a detailed explanation thereof is omitted.

Now, description will proceed to a comparison operation in the related art.

Comparison between integers v and w (e.g., v<=w) is computable by the bit sharing and a combination of XOR and AND.

For example, it is assumed that each of v and w is 1 bit. In this event, the comparison (v<=w) is computable by the following equation:

$$(v <= w) = (1 \wedge v) \wedge (v \& w).$$

Accordingly, the comparison requires one AND and two XOR.

If this operation is carried out by the secure computation, computation is possible for v and w which are secretly shared.

Consequently, in a case of 32-bit integers, much more AND and XOR are required.

Furthermore, in a case where the integers v and w to be compared are subjected to the ring sharing and a compared result is desired to be obtained with the ring sharing, the following processing is required:

1) Converts v and w from the ring sharing to the bit sharing (bit decomposition), 2) Computes the compared result with AND/XOR in the above-mentioned manner, and 3) Converts the result from the bit sharing to the ring sharing (bit composition).

As described above, the related art has a problem that AND/XOR is required for the comparison operation between the integers v and w and a computation time becomes longer.

SUMMARY OF THE INVENTION

Now, a principle of a proposal method of the present invention will be described with reference to comparison in a case of (a<=b) by way of example.

In this event, two integers a and b are shared and held in first through third secure computation devices.

It is assumed that the ring sharing is as follows:

$a = a0+a1+a2$, and $b = b0+b1+b2$.

In this event, the first through the third secure computation devices (Party0, Party1, Party2) hold:
Party0: (a2,a0), (b2,b0),
Party1: (a0,a1), (b0,b1), and
Party2: (a1,a2), (b1,b2).

Accordingly, it is noted that addition/subtraction circuitries in the first through the third secure computation devices carry out addition/subtraction without using the integers a and b as they are but using shared values of those values.

Hereinafter, description will proceed to an example of implementing a case with a limitation to $0<=a$, $b<2^k$. Herein, $2^k$ represents 2 to the k-th power and k is an integer which is not less than one. It is noted that, if uint32_t is used as a variable, up to k=31 is possible.

Assuming $c=2^k-a$, $(b+c)/(a+c)$ is computed.

Herein, an operator/is a function of calculating an integer part of a result (a divided result) obtained by dividing a numerator by a denominator. In other words, the operator/is the function of rounding the divided result to an integer by truncating the numbers after a decimal point.

Inasmuch as $2^k<=a+c$, $b+c<=2^{(k+1)}$, the following equation is obtained:

$$(b+c)/(a+c) = 1 (a <= b),$$
$$= 0 (a > b).$$

In addition, inasmuch as $a+c=2^k$, the following equation holds:

$$(b+c)/(a+c) = (b+c)/2^k.$$

The right side of the above-mentioned equation corresponds to dividing (b+c) by $2^k$ (shifts right by k bits) or indicates that a (k+1)-th bit represents a compared result. In addition, the shifting is possible with the bit sharing.

Now, description will be made as regards <shifting right by k bits>. When $v = v0 \wedge v1 \wedge v2$, then $v>>k = (v0>>k) \wedge (v1>>k) \wedge (v2>>k)$, therefore the secure computation is possible.

Accordingly, in the proposal method of the present invention, a computation procedure in the case of $a<=b$ is as follows.

A procedure in a case where a and b are less than $2^k$ and are subjected to the ring sharing is as follows:

(1) Computes $b+2^k-a$ with the ring sharing (where $2^k$ is a constant);
(2) Converts the result $(b+2^k-a)$ into the bit sharing (bit decomposition);
(3) Shifts by k bits; and
(4) Converts the result into the ring sharing (bit composition).

In a case where the result with the bit sharing is sufficient, the step (4) is unnecessary. In addition, in lieu of the step (3), a (k+1)-th bit may be extracted.

Now, description will be made about application except for the comparison of $a<=b$.

By operating in the following manner, application is possible to those except for the comparison of $a<=b$.

In a case of comparison of $a<b$, $a+1<=b$ is computed.

In another case of comparisons of $a>b$ and $a>=b$, computation is carried out by replacing a and b with each other.

The foregoing is summarized as follows.

When the integers a and b satisfy $0<=a$, $b<=2^k$, $a<=b$ is computed by $(b+c)/(a+c)$.

When the two integers a and b are secret-shared, comparison is carried out by the secure computation with the above-mentioned procedure.

EXAMPLE EMBODIMENT

Figure 2:
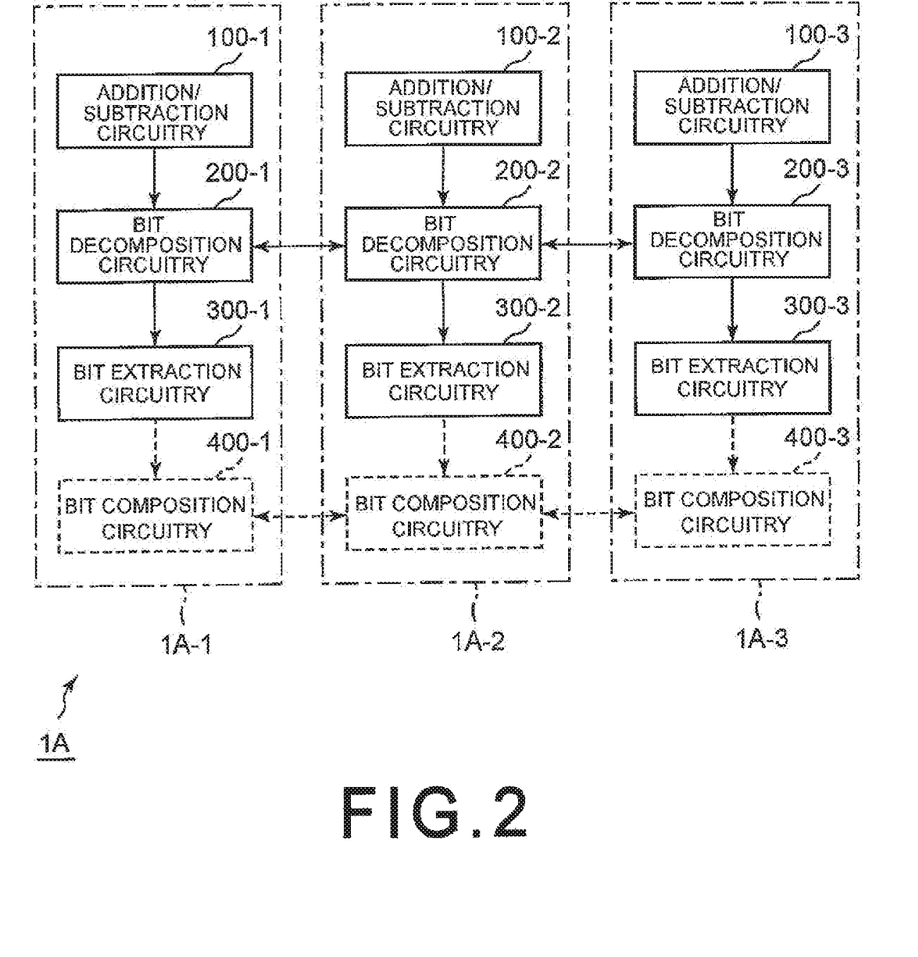
FIG. 2 is a block diagram for illustrating a configuration of a secure computation system according to an example embodiment of the present invention.

First, referring to FIG. 2, description will proceed to a secure computation system 1A according to an example embodiment of the present invention.

FIG. 2 is a block diagram for illustrating a configuration of the secure computation system 1A. The secure computation system 1A comprises first through third secure computation devices 1A-1, 1A-2, and 1A-3.

The first through the third secure computation devices 1A-1 to 1A-3 are devices which are capable of carrying out a comparison operation between two integers, as will later be described. Of course, the first through the third secure computation devices 1A-1 to 1A-3 can carry out operations except for the comparison operation. However, description thereof is omitted because they are not related to this invention.

The first through the third secure computation devices 1A-1 to 1A-3 have the same configuration.

Specifically, the first secure computation device 1A-1 comprises a first addition/subtraction circuitry 100-1, a first bit decomposition circuitry 200-1, and a first bit extraction circuitry 300-1. Similarly, the second secure computation device 1A-2 comprises a second addition/subtraction circuitry 100-2, a second bit decomposition circuitry 200-2, and a second bit extraction circuitry 300-2. The third secure computation device 1A-3 comprises a third addition/subtraction circuitry 100-3, a third bit decomposition circuitry 200-3, and a third bit extraction circuitry 300-3.

The first secure computation device 1A-1 may further comprise a first bit composition circuitry 400-1, as depicted by a broken line. Likewise, the second computation device 1A-2 may further comprise a second bit composition circuitry 400-2 and the third computation device 1A-3 may further comprise a third bit composition circuitry 400-3.

Inasmuch as the first through the third secure computation devices 1A-1 to 1A-3 have the same configuration as mentioned above, the first secure computation device 1A-1 will hereinafter be described as a representative example for the sake of simplification of explanation.

It is assumed that a first integer a and a second integer b, each of which is 0 or more and less than $2^k$ (k being an integer which is not less than one), are subjected to ring sharing. In this event, the first secure computation device 1A-1 compares the first integer a with the second integer b in the following manner. Hereinafter, description will proceed to, by way of example, a case of detecting whether or not the first integer a is not more than the second integer b $(a<=b)$.

The first addition/subtraction circuitry 100-1 carries out, using the first integer a, the second integer b, and $2^k$, a predetermined addition/subtraction with the ring sharing to produce a first added/subtracted result. Specifically, the first addition/subtraction circuitry 100-1 computes $(b+2^k-a)$ as the predetermined addition/subtraction with the ring sharing to produce (b+2^k−a) as the first added/subtracted result.

The first bit decomposition circuitry 200-1 converts the first added/subtracted result into bit sharing to produce a first bit shared result.

The first bit extraction circuitry 300-1 extracts a (k+1)-th bit of the first bit shared result to produce a first extracted result. The first bit extraction circuitry 300-1 can be achieved as a first shifting circuitry for shifting the first bit shared result right by k bits to produce a first shifted result as the first extracted result.

The first bit composition circuitry 400-1 converts the first extracted result into ring sharing to produce a first ring shared result.

Other comparison computations except for (a<=b) may also be carried out in the following manner.

It is assumed that whether or not the first integer a is less than the second integer b (a<b) is detected. In this event, the first addition/subtraction circuitry 100-1 computes (b+2^k−(a+1)) as the above-mentioned addition/subtraction with the ring sharing to produce (b+2^k−(a+1)) as the first added/subtracted result. However, this method is applicable in a case of a+1<2^k.

In addition, it is assumed that whether or not the first integer a is not less than the second integer b (a>=b) is detected. In this event, the first addition/subtraction circuitry 100-1 computes (a+2^k−b) as the predetermined addition/subtraction with the ring sharing to produce (a+2^k−b) as the first added/subtracted result.

Finally, it is assumed that whether or not the first integer a is more than the second integer b (a>b) is detected. In this event, the first addition/subtraction circuitry 100-1 computes (a+2^k−(b+1)) as the above-mentioned addition/subtraction with the ring sharing to produce (a+2^k−(b+1)) as the first added/subtracted result. However, this method is applicable in a case of a+1<2^k.

Thus, in this example embodiment, it is possible to carry out the comparison computation without AND/XOR operation.

Example 1

Now, description will proceed to a first example of the present invention.

Figure 3:
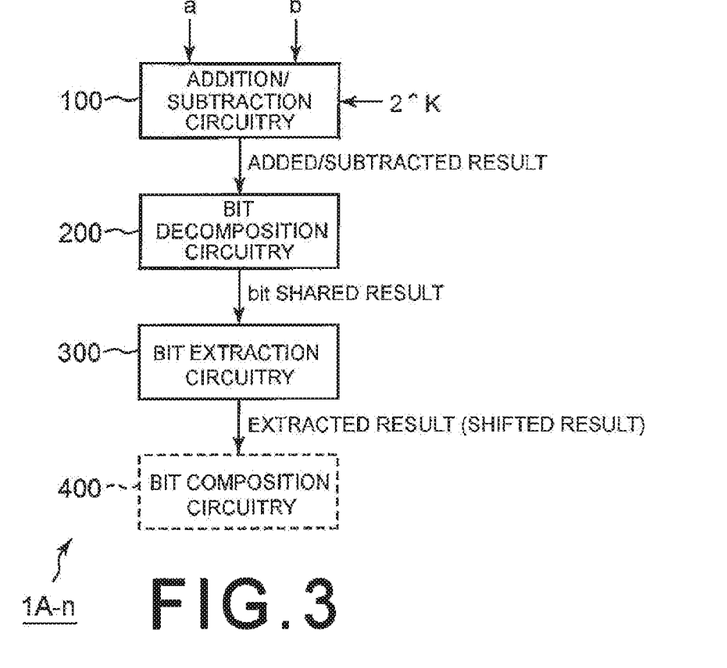
FIG. 3 is a block diagram for illustrating an n-th secure computation device for use in the secure computation system illustrated in FIG. 2.

FIG. 3 is a block diagram for illustrating an n-th secure computation device 1A-n (n being an integer 1, 2, or 3) for use in the secure computation system 1A illustrated in FIG. 2.

The n-th secure computation device 1A-n comprises an addition/subtraction circuitry 100, a bit decomposition circuitry 200, and a bit extraction circuitry 300. The n-th secure computation device 1A-n may further comprise a bit composition circuitry 400, as depicted by a broken line.

The addition/subtraction circuitry 100 is supplied with the first integer a and the second integer b, each of which is 0 or more and less than 2^k (k being an integer which is not less than one), and 2^k. The addition/subtraction circuitry 100 carries out the predetermined addition/subtraction using the first integer a, the second integer b, and 2^k with the ring sharing to produce an added/subtracted result. In this example, it is assumed that, as a comparison operation, whether or not the first integer a is not more than the second integer b (a<=b) is detected. In this event, the addition/subtraction circuitry 100 computes (b+2^k−a) as the predetermined addition/subtraction with the ring sharing to produce (b+2^k−a) as the added/subtracted result.

The added/subtracted result is supplied to the bit decomposition circuitry 200. The bit decomposition circuitry 200 converts the added/subtracted result into bit sharing to produce a bit shared result.

The bit shared result is supplied to the bit extraction circuitry 300. The bit extraction circuitry 300 extracts a (k+1)-th bit of the bit shared result to produce an extracted result. In addition, the bit extraction circuitry 300 can be achieved as a shifting circuitry for shifting the bit shared result right by k bits to produce a shifted result as the extracted result.

The shifted result is supplied to the bit composition circuitry 400. The bit composition circuitry 400 converts the shifted result into ring sharing to produce a ring shared result.

Figure 4:
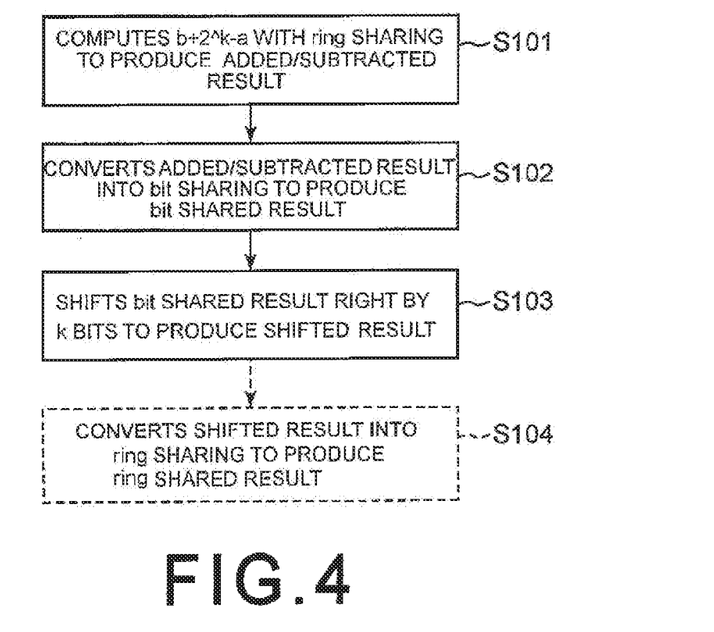
FIG. 4 is a flow chart for describing an operation of the n-th computation device illustrated in FIG. 3.

FIG. 4 is a flow chart for use in describing an operation of the n-th secure computation device 1A-n illustrated in FIG. 3.

The addition/subtraction circuitry 100 computes (b+2^k−a) with the ring sharing to produce (b+2^k−a) as the added/subtracted result (step S101).

Next, the bit decomposition circuitry 200 converts the added/subtracted result into the bit sharing to produce the bit shared result (step S102).

Subsequently, the bit extraction circuitry 300 shifts the bit shared result right by k bits to produce the shifted result as the extracted result (step S103).

As an option, the bit composition circuitry 400 converts the shifted result into the ring sharing to produce the ring shared result (step S104).

Other comparison computations except for (a<=b) are possible by the addition/subtraction circuitry 100 carrying out the predetermined addition/subtraction as described above.

Now, description will proceed to an effect of the first example of the present invention.

Using this comparison method brings about an effect that the comparison computation can be carried out without AND/XOR operation.

Example 2

Now, description will proceed to a second example of the present invention.

In the second example, description will be made about <an example in a ring of 2^4 (=16)>. Herein, it is assumed that k=3 (2^k=8). In this example, description will proceed to a case of computing a<=b where a=5, b=7.

First, it is assumed that a, b, and 2^k are subjected to ring sharing as follows:

$$a = 7+6+8 \ (=21\%16=5)$$

$$b = 9+3+11 \ (=23\%16=7)$$

$$2^k = 1+15+8 \ (=24\%16=8)$$

Herein, % means mod and indicates congruence modulo. Accordingly, 21%16=5 indicates that the remainder obtained by dividing 21 by 16 is equal to 5.

The respective parties compute (b+2^5−a). Herein, n=4.

party0: $(b+2^k-a)\%2^n = (9+1-7)\%16 = 3$ party1: $(b+2^k-a)\%2^n = (3+15-6)\%16 = 12$ party2: $(b+2^k-a)\%2^n = (11+8-8)\%16 = 11$ When the added/subtracted result is decoded, (3+12+11)%16=10 is obtained.

The bit shared result, which is obtained by bit-decomposing the added/subtracted result, is as follows:
party0: 1111
party1: 0110
party2: 0011
When the above result is decoded, $1111 \wedge 0110 \wedge 0011 = 1010$ (10 in decimal number) is obtained. A (k+1)-th bit (e.g. fourth bit) is 1 and this represents a result of $a<=b$ ($5<=7$).

When shifting right by k bits is carried out in order to extract the (k+1)-th bit, the following is obtained:
party0: 0001
party1: 0000
party2: 0000
When the above is decoded, $0000 \wedge 0001 \wedge 0000 = 0001$ is obtained, which is the bit sharing of the result of $a<=b$.

When the bit composition is carried out in order to obtain the result with the ring sharing, the following is obtained:
party0: 1
party1: 4
party2: 12
When the above is decoded, $(1+4+12)\%16=1$ is obtained, which is the ring sharing of the result of $a<=b$.

As described above, according to the second example, it is understood that the comparison computation can be carried out without AND/XOR operation.

Furthermore, this invention is not limited to the foregoing example embodiment and examples as they are, but may be embodied in an implementation stage by changing the components in a range not departing from the gist of this invention. In addition, various inventions may be formed by an appropriate combination of a plurality of components. For example, in the foregoing example embodiment (examples), description has been made about only the case of the secure computation system comprising the three secure computation devices. However, it is needless to say that this invention is generally applicable in a similar manner also to a case of the secure computation system comprising N secure computation devices (where N represents an integer which is not less than three).

It is noted that the method described in the present invention may be executed by a computer. A program causing this method to be executed may be distributed by storing the program in a recording medium, for example, a magnetic disk such as a floppy (registered trademark) disk, a hard disk, and so on, an optical disc such as a CD-ROM (Compact Disc-Read Only memory), a DVD (digital versatile disc) and so on, a magneto-optical disc, a semiconductor memory, or the like.

Furthermore, the recording medium may have any form of a storage format as far as the recording medium can store the program and can be read by the computer.

In addition, a part of each processing may be executed by an operating system or a middleware, such as a database management software, a network software or the like, operating on the computer on the basis of instructions of the program installed from the recording medium to the computer.

Moreover, the above-mentioned recording medium is not restricted to a medium independent from the computer and includes a recording medium in which the program transmitted via a LAN (Local Area Network), the Internet, or the like is downloaded and stored or temporarily stored.

In addition, the recording medium is not restricted to one and the recording medium according to this invention includes a case where the processing according to the above-mentioned example embodiment (examples) is carried out with a plurality of media. Configuration of the medium may be any configuration.

The computer in this invention executes each processing based on the program stored in the recording medium and may have any configuration such as a device composed of a personal computer or the like, a system including a plurality of devices connected via a network, and so on.

In addition, the computer in this invention is not restricted to the personal computer and is equipment or a device which includes a processing unit to be included in an information processing apparatus and which is capable of realizing the function of this invention by using the program.

Specifically, each part of the n-th secure computation device 1A-n may be implemented by a combination of hardware and software. In a form in which the hardware and the software are combined, the respective parts are implemented as various kinds of means by developing a comparison program in an RAM (random access memory) and making hardware such as a control unit (CPU (central processing unit)) or the like operate based on the comparison program. The comparison program may be recorded in a recording medium to be distributed, as mentioned above. A comparison program recorded in the recording medium is read into a memory via a wire, wirelessly, or via the recording medium itself to operate the control unit and so on. By way of example, the recording medium may be an optical disc, a magnetic disk, a semiconductor memory device, a hard disk, or the like.

Explaining the above-mentioned example embodiment with a different expression, it is possible to implement the example embodiment by making a computer to be operated as the n-th secure computation device 1A-n act as the addition/subtraction circuitry 100, the bit decomposition circuitry 200, the bit extraction circuitry 300, and the bit composition circuitry 400 according to the comparison program developed in the RAM.

A part or a whole of the example embodiment described above may be described as, but not limited to, the following supplementary notes.

(Supplementary Note 1)

A secure computation device for comparing, in a case where a first integer a and a second integer b, each of which is more than 0 and less than $2^k$ (where k is an integer equal to or more than one), are subjected to ring sharing, the first integer a with the second integer b, wherein the secure computation device comprises:

an addition/subtraction circuitry configured to carry out a predetermined addition/subtraction using the first integer a, the second integer b, and $2^k$ with the ring sharing to produce an added/subtracted result;

a bit decomposition circuitry configured to convert the added/subtracted result into bit sharing to produce a bit shared result; and a bit extraction circuitry configured to extract a (k+1)-th bit of the bit shared result to produce an extracted result.

(Supplementary Note 2)

The secure computation device according to Supplementary Note 1, wherein the bit extraction circuitry comprises a shifting circuitry configured to shift the bit shared result right by k bits to produce a shifted result as the extracted result.

(Supplementary Note 3)

The secure computation device according to Supplementary Note 2, further comprising a bit composition circuitry configured to convert the shifted result into ring sharing to produce a ring shared result.

(Supplementary Note 4)

The secure computation device according to any one of Supplementary Notes 1 to 3, wherein:

in a case of detecting whether or not the first integer a is not more than the second integer b, the addition/subtraction circuitry is configured to calculate $(b+2^k-a)$ with ring sharing as the predetermined addition/subtraction to produce $(b+2^k-a)$ as the added/subtracted result.

(Supplementary Note 5)

The secure computation device according to any one of Supplementary Notes 1 to 3, wherein:

in a case of detecting whether or not the first integer a is less than the second integer b, the addition/subtraction circuitry is configured to calculate $(b+2^k-(a+1))$ with ring sharing as the predetermined addition/subtraction to produce $(b+2^k-(a+1))$ as the added/subtracted result.

(Supplementary Note 6)

The secure computation device according to any one of Supplementary Notes 1 to 3, wherein:

in a case of detecting whether or not the first integer a is not less than the second integer b, the addition/subtraction circuitry is configured to calculate $(a+2^k-b)$ with ring sharing as the predetermined addition/subtraction to produce $(a+2^k-b)$ as the added/subtracted result.

(Supplementary Note 7)

The secure computation device according to any one of Supplementary Notes 1 to 3, wherein:

in a case of detecting whether or not the first integer a is more than the second integer b, the addition/subtraction circuitry is configured to calculate $(a+2^k-(b+1))$ with ring sharing as the predetermined addition/subtraction to produce $(a+2^k-(b+1))$ as the added/subtracted result.

(Supplementary Note 8)

A secure computation system comprising N secure computation devices each of which is described in any one of Supplementary Notes 1 to 7, where N represents an integer which is not less three.

(Supplementary Note 9)

A comparison method for comparing, in a case where a first integer a and a second integer b, each of which is more than 0 and less than $2^k$ (where k is an integer equal to or more than one), are subjected to ring sharing, the first integer a with the second integer b in a secure computation device, wherein the comparison method comprises:

an addition/subtraction step of carrying out a predetermined addition/subtraction using the first integer a, the second integer b, and $2^k$ with the ring sharing to produce an added/subtracted result;

a bit decomposition step of converting the added/subtracted result into bit sharing to produce a bit shared result; and a bit extraction step of extracting a (k+1)-th bit of the bit shared result to produce an extracted result.

(Supplementary Note 10)

The comparison method according to Supplementary Note 9, wherein the bit extraction step comprises a shifting step of shifting the bit shared result right by k bits.

(Supplementary Note 11)

The comparison method according to Supplementary Note 10, further comprising a bit composition step for converting the shifted result into ring sharing to produce a ring shared result.

(Supplementary Note 12)

The comparison method according to any one of Supplementary Notes 9 to 11, wherein:

in a case of detecting whether or not the first integer a is not more than the second integer b, the addition/subtraction step calculates $(b+2^k-a)$ with ring sharing as the predetermined addition/subtraction to produce $(b+2^k-a)$ as the added/subtracted result.

(Supplementary Note 13)

The comparison method according to any one of Supplementary Notes 9 to 11, wherein:

in a case of detecting whether or not the first integer a is less than the second integer b, the addition/subtraction step calculates $(b+2^k-(a+1))$ with ring sharing as the predetermined addition/subtraction to produce $(b+2^k-(a+1))$ as the added/subtracted result.

(Supplementary Note 14)

The comparison method according to any one of Supplementary Notes 9 to 11, wherein:

in a case of detecting whether or not the first integer a is not less than the second integer b, the addition/subtraction step calculates $(a+2^k-b)$ with ring sharing as the predetermined addition/subtraction to produce $(a+2^k-b)$ as the added/subtracted result.

(Supplementary Note 15)

The comparison method according to any one of Supplementary Notes 9 to 11, wherein:

in a case of detecting whether or not the first integer a is more than the second integer b, the addition/subtraction step calculates $(a+2^k-(b+1))$ with ring sharing as the predetermined addition/subtraction to produce $(a+2^k-(b+1))$ as the added/subtracted result.

(Supplementary Note 16)

A comparison program recording medium storing a comparison program for causing, in a case where a first integer a and a second integer b, each of which is more than 0 and less than $2^k$ (where k is an integer equal to or more than one), are subjected to ring sharing, a computer serving as a secure computation device to compare the first integer a with the second integer b, wherein the comparison program causes the computer to achieve:

an addition/subtraction function of carrying out a predetermined addition/subtraction using the first integer a, the second integer b, and $2^k$ with the ring sharing to produce an added/subtracted result;

a bit decomposition function of converting the added/subtracted result into bit sharing to produce a bit shared result; and a bit extraction function of extracting a (k+1)-th bit of the bit shared result to produce an extracted result.

(Supplementary Note 17)

The comparison program recording medium according to Supplementary Note 16, wherein the bit extraction function comprises a shifting function of shifting the bit shared result right by k bits.

(Supplementary Note 18)

The comparison program recording medium according to Supplementary Note 17, wherein the comparison program further causes the computer to achieve a bit composition function of converting the shifted result into ring sharing to produce a ring shared result.

(Supplementary Note 19)

The comparison program recording medium according to any one of Supplementary Notes 16 to 18, wherein:

in a case of detecting whether or not the first integer a is not more than the second integer b, the addition/subtraction function calculates (b+2^k−a) with ring sharing as the predetermined addition/subtraction to produce (b+2^k−a) as the added/subtracted result.

(Supplementary Note 20)

The comparison program recording medium according to any one of Supplementary Notes 16 to 18, wherein:

in a case of detecting whether or not the first integer a is less than the second integer b, the addition/subtraction function calculates (b+2^k−(a+1)) with ring sharing as the predetermined addition/subtraction to produce (b+2^k−(a+1)) as the added/subtracted result.

(Supplementary Note 21)

The comparison program recording medium according to any one of Supplementary Notes 16 to 18, wherein:

in a case of detecting whether or not the first integer a is not less than the second integer b, the addition/subtraction function calculates (a+2^k−b) with ring sharing as the predetermined addition/subtraction to produce (a+2^k−b) as the added/subtracted result.

(Supplementary Note 22)

The comparison program recording medium according to any one of Supplementary Notes 16 to 18, wherein:

in a case of detecting whether or not the first integer a is more than the second integer b, the addition/subtraction function calculates (a+2^k−(b+1)) with ring sharing as the predetermined addition/subtraction to produce (a+2^k−(b+1)) as the added/subtracted result.

This application is based upon and claims the benefit of priority from Japanese patent application No. 2017-98853, filed on May 18, 2017, the disclosure of which is incorporated herein in its entirety by reference.

REFERENCE SIGNS LIST 1A secure computation system
1A-1 first secure computation device
1A-2 second secure computation device
1A-3 third secure computation device
1A-n n-th secure computation device
100, 100-1 to 100-3 addition/subtraction circuitry
200, 200-1 to 200-3 bit decomposition circuitry
300, 300-1 to 300-3 bit extraction circuitry (shifting circuitry)
400, 400-1 to 400-3 bit composition circuitry

What is claimed is:

1. A secure computation device for use in each of three secure computation devices which share and save, as three shared values, data to be kept secret, each of the three secure computation devices carrying out secret sharing which is classified into bit sharing and ring sharing, the data being represented in the bit sharing by an exclusive OR of the three shared values, the data being represented in the ring sharing by an addition on the ring of the three shared values, the secure computation device comparing, in a case where a first integer a and a second integer b, each of which is more than 0 and less than 2^k (where k is an integer equal to or more than one), are subjected to the ring sharing, the first integer a with the second integer b, wherein the secure computation device comprises:

an addition/subtraction circuitry configured to carry out a predetermined addition/subtraction using the first integer a, the second integer b, and 2^k with the ring sharing to produce an added/subtracted result;

a bit decomposition circuitry configured to convert the added/subtracted result with the bit sharing to produce a bit shared result; and a bit extraction circuitry configured to extract a (k+1)-th bit of the bit shared result to produce an extracted result.

2. The secure computation device as claimed in claim 1, wherein the bit extraction circuitry comprises a shifting circuitry configured to shift the bit shared result right by k bits to produce a shifted result as the extracted result.

3. The secure computation device as claimed in claim 2, further comprising a bit composition circuitry configured to convert the shifted result with the ring sharing to produce a ring shared result.

4. The secure computation device as claimed in claim 1, wherein:

in a case of detecting whether or not the first integer a is not more than the second integer b, the addition/subtraction circuitry is configured to calculate (b+2^k−a) with the ring sharing as the predetermined addition/subtraction to produce (b+2^k−a) as the added/subtracted result.

5. The secure computation device as claimed in claim 1, wherein:

in a case of detecting whether or not the first integer a is less than the second integer b, the addition/subtraction circuitry is configured to calculate (b+2^k−(a+1)) with the ring sharing as the predetermined addition/subtraction to produce (b+2^k−(a+1)) as the added/subtracted result.

6. The secure computation device as claimed in claim 1, wherein:

in a case of detecting whether or not the first integer a is not less than the second integer b, the addition/subtraction circuitry is configured to calculate (a+2^k−b) with the ring sharing as the predetermined addition/subtraction to produce (a+2^k−b) as the added/subtracted result.

7. The secure computation device as claimed in claim 1, wherein:

in a case of detecting whether or not the first integer a is more than the second integer b, the addition/subtraction circuitry is configured to calculate (a+2^k−(b+1)) with the ring sharing as the predetermined addition/subtraction to produce (a+2^k−(b+1)) as the added/subtracted result.

8. A secure computation system comprising N secure computation devices each of which is described in claim 1, where N represents an integer which is not less three.

9. A comparison method for use in each of three secure computation devices which share and save, as three shared values, data to be kept secret, each of the three secure computation devices carrying out secret sharing which is classified into bit sharing and ring sharing, the data being represented in the bit sharing by an exclusive OR of the three shared values, the data being represented in the ring sharing by an addition on the ring of the three shared values, the comparison method comparing, in a case where a first integer a and a second integer b, each of which is more than 0 and less than 2^k (where k is an integer equal to or more than one), are subjected to the ring sharing, the first integer a with the second integer b in a secure computation device, wherein the comparison method comprises:

an addition/subtraction step of carrying out a predetermined addition/subtraction using the first integer a, the second integer b, and 2^k with the ring sharing to produce an added/subtracted result;

a bit decomposition step of converting the added/subtracted result with the bit sharing to produce a bit shared result; and a bit extraction step of extracting a (k+1)-th bit of the bit shared result to produce an extracted result.

10. The comparison method as claimed in claim 9, wherein the bit extraction step comprises a shifting step of shifting the bit shared result right by k bits.

11. The comparison method as claimed in claim 9, wherein:

in a case of detecting whether or not the first integer a is not more than the second integer b, the addition/subtraction step calculates $(b+2^k-a)$ with the ring sharing as the predetermined addition/subtraction to produce $(b+2^k-a)$ as the added/subtracted result.

12. The comparison method as claimed in claim 9, wherein:

in a case of detecting whether or not the first integer a is less than the second integer b, the addition/subtraction step calculates $(b+2^k-(a+1))$ with the ring sharing as the predetermined addition/subtraction to produce $(b+2^k-(a+1))$ as the added/subtracted result.

13. The comparison method as claimed in claim 9, wherein:

in a case of detecting whether or not the first integer a is not less than the second integer b, the addition/subtraction step calculates $(a+2^k-b)$ with the ring sharing as the predetermined addition/subtraction to produce $(a+2^k-b)$ as the added/subtracted result.

14. The comparison method as claimed in claim 9, wherein:

in a case of detecting whether or not the first integer a is more than the second integer b, the addition/subtraction step calculates $(a+2^k-(b+1))$ with the ring sharing as the predetermined addition/subtraction to produce $(a+2^k-(b+1))$ as the added/subtracted result.

15. A non-transitory computer readable recording medium storing a comparison program for use in each of three secure computation devices which share and save, as three shared values, data to be kept secret, each of the three secure computation devices carrying out secret sharing which is classified into bit sharing and ring sharing, the data being represented in the bit sharing by an exclusive OR of the three shared values, the data being represented in the ring sharing by an addition on the ring of the three shared values, the comparison program causing, in a case where a first integer a and a second integer b, each of which is more than 0 and less than $2^k$ (where k is an integer equal to or more than one), are subjected to the ring sharing, a computer serving as a secure computation device to compare the first integer a with the second integer b, wherein the comparison program causes the computer to achieve:

an addition/subtraction function of carrying out a predetermined addition/subtraction using the first integer a, the second integer b, and $2^k$ with the ring sharing to produce an added/subtracted result;

a bit decomposition function of converting the added/subtracted result with the bit sharing to produce a bit shared result; and a bit extraction function of extracting a (k+1)-th bit of the bit shared result to produce an extracted result.

16. The non-transitory computer readable recording medium as claimed in claim 15, wherein the bit extraction function comprises a shifting function of shifting the bit shared result right by k bits.

17. The non-transitory computer readable recording medium as claimed in claim 15, wherein:

in a case of detecting whether or not the first integer a is not more than the second integer b, the addition/subtraction function calculates $(b+2^k-a)$ with the ring sharing as the predetermined addition/subtraction to produce $(b+2^k-a)$ as the added/subtracted result.

18. The non-transitory computer readable recording medium as claimed in claim 15, wherein:

in a case of detecting whether or not the first integer a is less than the second integer b, the addition/subtraction function calculates $(b+2^k-(a+1))$ with the ring sharing as the predetermined addition/subtraction to produce $(b+2^k-(a+1))$ as the added/subtracted result.

19. The non-transitory computer readable recording medium as claimed in claim 15, wherein:

in a case of detecting whether or not the first integer a is not less than the second integer b, the addition/subtraction function calculates $(a+2^k-b)$ with the ring sharing as the predetermined addition/subtraction to produce $(a+2-k-b)$ as the added/subtracted result.

20. The non-transitory computer readable recording medium as claimed in claim 15, wherein:

in a case of detecting whether or not the first integer a is more than the second integer b, the addition/subtraction function calculates $(a+2-k-(b+1))$ with the ring sharing as the predetermined addition/subtraction to produce $(a+2-k-(b+1))$ as the added/subtracted result.

* * * * *